Figure 7:
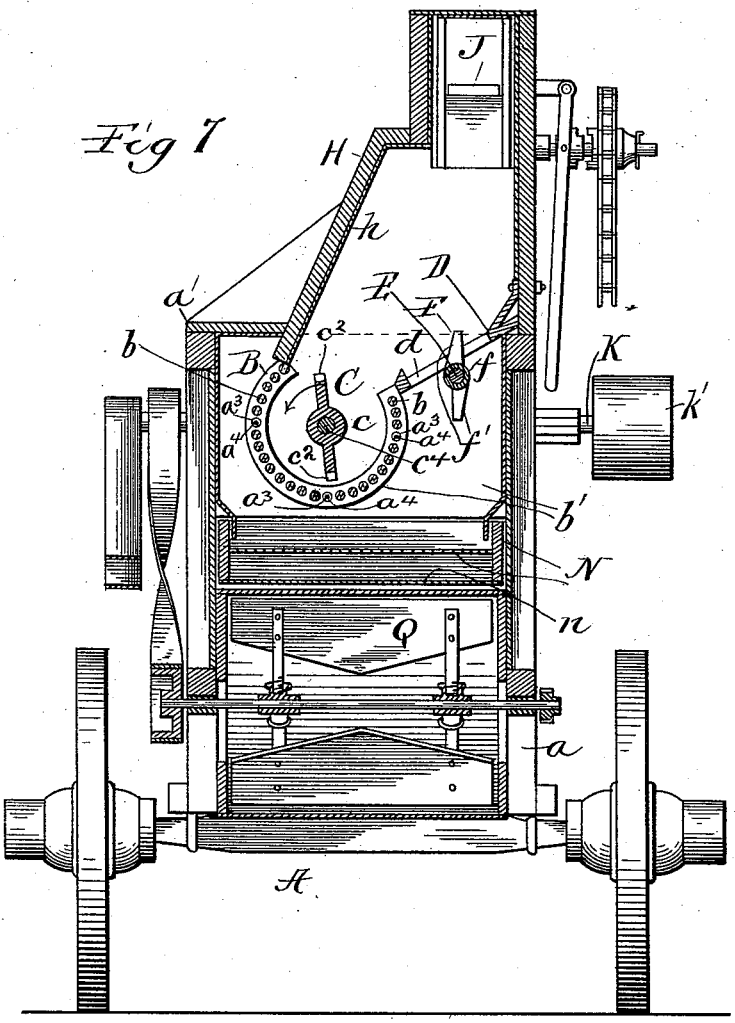

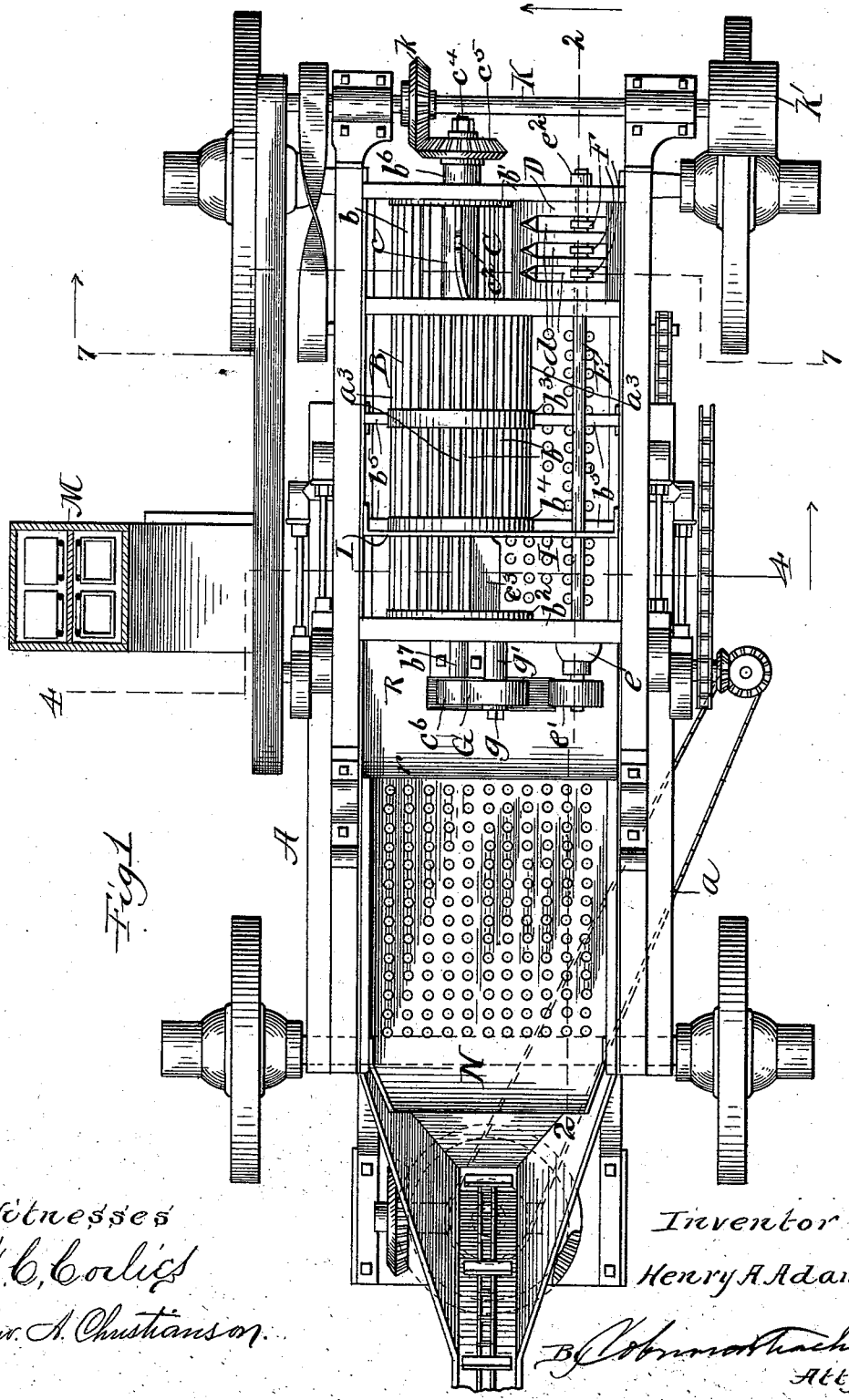

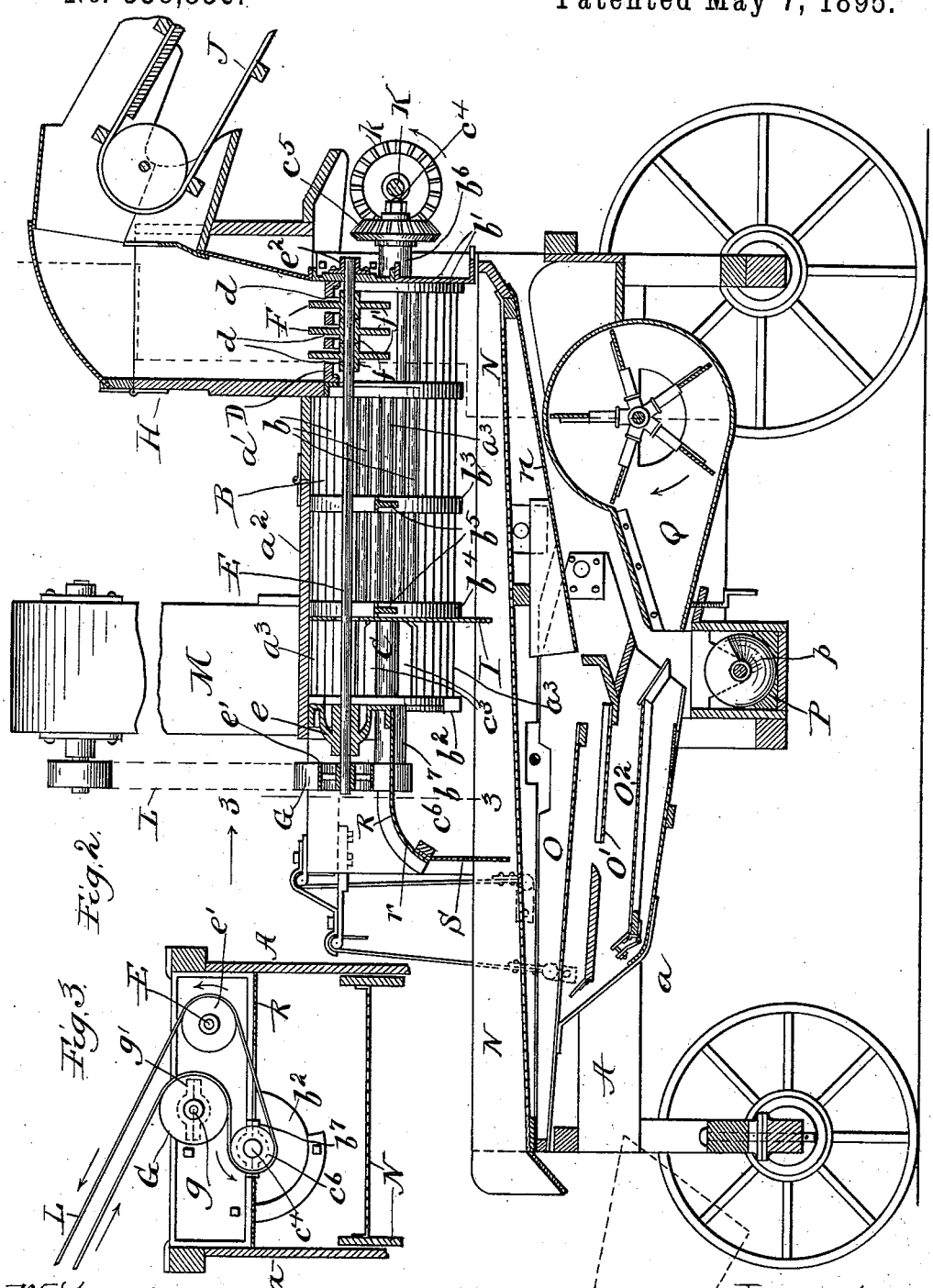

(No Model.) 5 Sheets—Sheet 3.
H. A. ADAMS.
CORN SHELLER.
No. 538,856. Patented May 7, 1895.
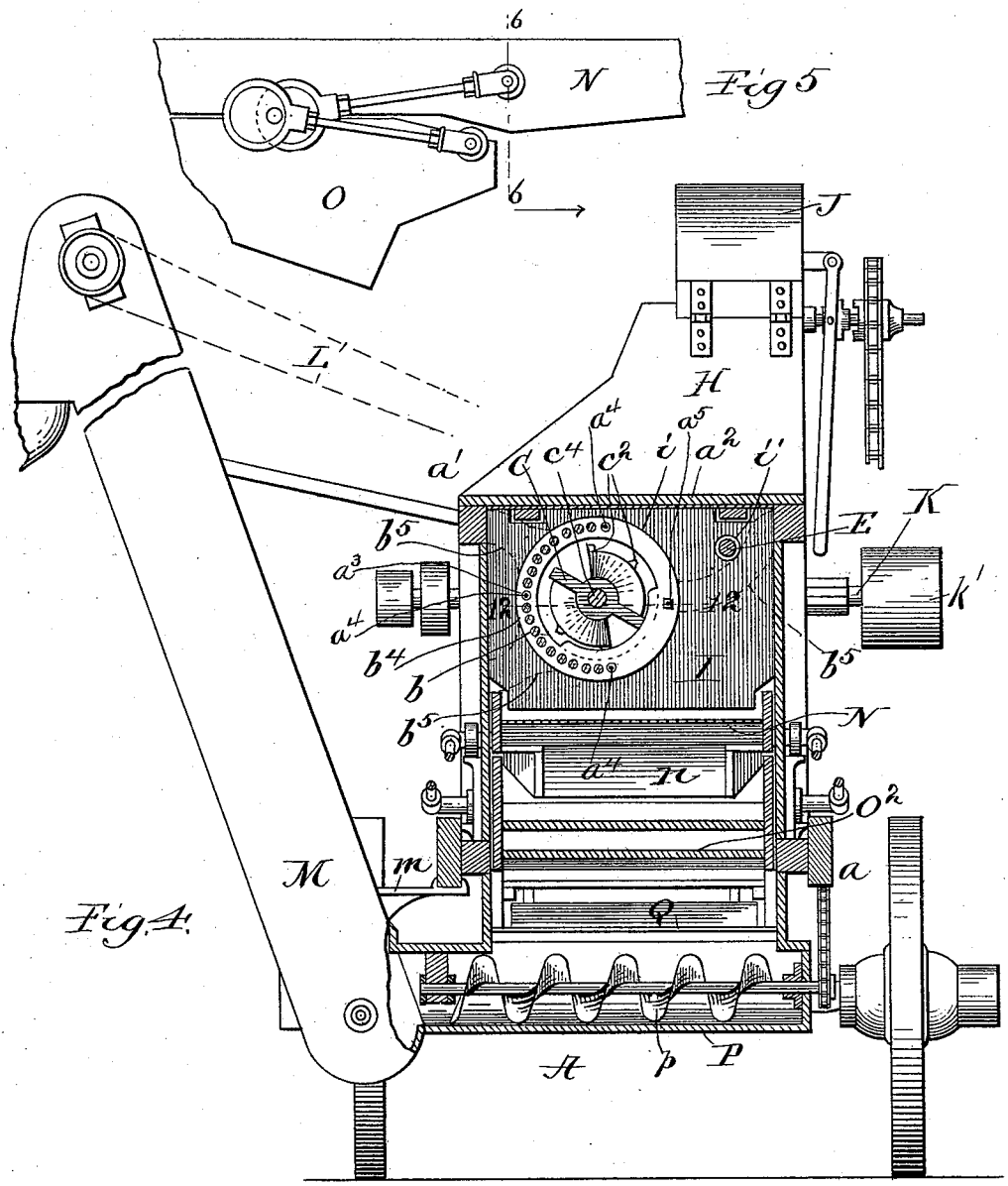

(No Model.)  5 Sheets—Sheet 4.

H. A. ADAMS.
CORN SHELLER.

No. 538,856.  Patented May 7, 1895.

Witnesses
W. C. Coclies
Jno. A. Christianson.

Inventor
Henry A. Adams
By Coburn & Thacher
Atty's

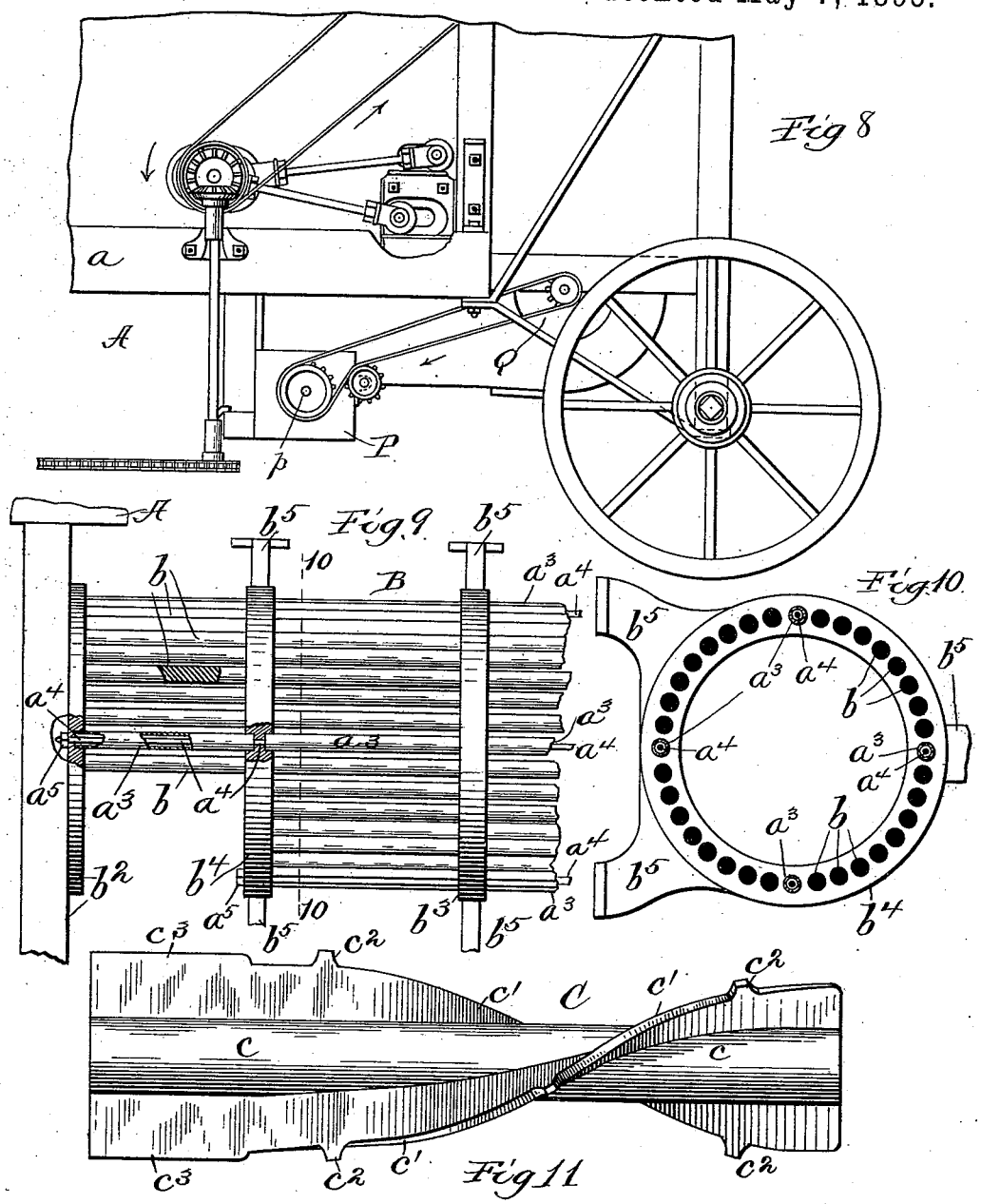

UNITED STATES PATENT OFFICE.

HENRY A. ADAMS, OF SANDWICH, ILLINOIS, ASSIGNOR TO THE SANDWICH MANUFACTURING COMPANY, OF SAME PLACE.

CORN-SHELLER.

SPECIFICATION forming part of Letters Patent No. 538,856, dated May 7, 1895.

Application filed November 27, 1894. Serial No. 530,120. (No model.)

*To all whom it may concern:*

Be it known that I, HENRY A. ADAMS, a citizen of the United States, residing at Sandwich, in the county of De Kalb and State of Illinois, have invented certain new and useful Improvements in Corn-Shellers, which are fully set forth in the following specification, reference being had to the accompanying drawings, in which—

Figure 1 represents a plan view of a corn-sheller embodying my invention; Fig. 2, a longitudinal vertical section of the same, taken on the line 2 2 of Fig. 1; Fig. 3, a detail section taken on the line 3 3 of Fig. 2; Fig. 4, a transverse vertical section taken on the broken line 4 4 of Fig. 1; Fig. 5, a detail side elevation showing a part of the separators and devices for reciprocating them; Fig. 6, a cross-section of the same, taken on the line 6 6 of Fig. 5; Fig. 7, a transverse vertical section taken on the line 7 7 of Fig. 1; Fig. 8, a detail side elevation near the rear end and on the left of the mounted machine; Fig. 9, a detail side elevation of a portion of the shelling cylinder or case at the rear end thereof; Fig. 10, a transverse section of the same on the line 10 10 of Fig. 9; Fig. 11, a side elevation of the rotary sheller detached, and Fig. 12 a detail plan section taken on the line 12 12 of Fig. 4. In these drawings Figs. 1 to 8, inclusive, and Fig. 12 are upon one and the same scale, and Figs. 9, 10, and 11 upon another and enlarged scale.

My invention relates to corn shelling machines adapted to the shelling of ears of corn either husked or in the shuck. In these machines the ears of corn are delivered to the shelling mechanism in the shucks, that is, without husking, or they are first husked, and in either case the kernels of corn are detached from the cobs and in the latter case freed from the husks by the operation of shelling devices of peculiar construction. The detached corn is delivered from the shelling mechanism to suitable separating devices and thence from the machine to receptacles or other ordinary receivers of shelled corn, while the cobs and shucks, when the ears are not first husked, are passed from the shelling devices to a conveyer by means of which they are carried off to a wagon for removal, or to a stack like the ordinary cob-stacker.

The invention consists in certain special features of construction in the shelling mechanism, and some other special features of the machine relating to the feed devices and the separating devices.

A corn sheller embodying my improvements will now be described in detail, both as to construction and operation, and the special improvements which I believe to be new and desire to secure by Letters Patent will be more definitely set forth in claims following the description.

In the drawings A represents the main frame of the machine which is here shown as mounted on carrying wheels for transportation from place to place. This frame may be considered as consisting of two sections, a lower one, $a$, of full length, and an upper one, $a'$, somewhat shorter than the lower, that is, it does not extend so far to the rear as the lower section. The top or cover, $a^2$, of this upper section is hinged near one end so that almost the entire cover can be raised to reach the interior of the case. Within this upper casing or section of the frame there is mounted a cylinder, B, which may be called the shelling cylinder. This is composed of a series of solid rods, $b$, and a tubular rod, $a^3$, located preferably at each quarter of the cylinder circle. The rods are mounted and secured in place by means of a front head, $b'$, and rear head, $b^2$, in which the ends of the rods are set, and rings, $b^3$—$b^4$, which are arranged at intervals along the case between the two ends and secured by brace arms, $b^5$, to the sides of the case, the last ring, $b^4$, being next to the rear end head. These parts are still further secured by rods, $a^4$, passing through the tube rods, $a^3$, and fastened by nuts, $a^5$, on the ends projecting from the heads set up against the latter. At its front end the top of the cylinder is partly cut away, or rather the upper rods extend only to the first ring from the forward head, thereby providing a top opening into the cylinder. At the rear end the lower cylinder rods extend only to the last ring $b^4$, thereby providing an opening in the under part of the cylinder at the rear end thereof. The first is for the delivery of corn into the cylinder, and the last for the discharge therefrom. The rods composing the cylinder are separated slightly from each other so as to provide spaces between adjacent rods sufficiently large for the passage of kernels of corn. A revolving sheller, C, is mounted within this cylinder. This device consists of a shaft, $c$, running centrally through the cylinder and extending from head to head of the latter. This shaft is provided with spiral wings or flanges, $c'$, two in number, arranged opposite each other on the shaft. These wings or flanges run in a regular spiral from one end of the shaft to the other, and at their outer edges are provided at intervals with lugs or projections, $c^2$, and at the rear end with an extension, $c^3$, some distance along each edge, running out nearly even with the lugs. The lugs or projections $c^2$ are preferably arranged so that when the parts are set up in working position the lugs will stand in about the same vertical plane as the respective rings of the cylinder. Preferably this winged shaft is tubular, and a small solid shaft, $c^4$, passes through it, the latter being fixed on this smaller shaft by shrinkage or in any other suitable way. This shaft $c^4$ extends beyond the winged shaft $c$ at each end and passes through the two heads of the cylinder in which it has bearings; and for additional support to this shaft, which is rapidly revolved, there is a strong bracket fastened to the outside of each cylinder head, the bracket $b^6$ on the front head and $b^7$ on the rear head, each of which provides a journal bearing for the respective projecting ends of the small shaft. At the front end of the small shaft, outside of the bearing bracket, there is a bevel gear, $c^5$, fixed thereon, and at the rear end thereof, outside the bearing bracket $b^7$, there is a pulley, $c^6$, also fixed thereon. These shelling devices are arranged a little to one side of the frame casing so that there is a wider space between the cylinder and casing on one side than on the other.

At the front end of the cylinder casing and on the side of the wider space mentioned above there is a fixed shelf or chute, D, the width of the space between the first two supports of the cylinder, completely filling said space and extending from the side of the casing inward toward the cylinder on an incline downward and terminating at its inner edge with the cut-away edge of the cylinder on that side, thereby forming a kind of incline directly to the opening into the cylinder at the front end thereof, as seen in Fig. 7. This chute is provided with a series of slots, $d$, extending lengthwise thereof from near the side of the casing to the shelling cylinder.

A small shaft, E, is mounted in suitable bearings in the respective heads of the cylinder and brackets thereon. The shaft, E, is located in the wider space between the cylinder and casing, being arranged a little higher than the sheller shaft so as to pass directly underneath the chute D. At the front end of this shaft there is a series of short lugs or arms, F, corresponding in number to the slots in the chute and projecting on each side of the shaft, being of sufficient length to extend up through the chute slots on the upper portion of their revolution. These arms may be called forcing or beater arms and may be made and secured to the shaft in any suitable way. In the drawings, however, they are shown as made in pairs, each pair a single article and having a short hub, $f$, in one piece with the two arms, $f'$, of respective pairs, these hubs being fixed on the shaft in any suitable way. The bearing for the rear end of this armed shaft is a strong bracket, $e$, which is fastened to the outside of the rear head and constructed to provide a bearing for the shaft, and a band pulley, $e'$, is secured to the end of the shaft outside this bracket and in the same vertical plane as the pulley on the rear end of the sheller shaft. The front bearing bracket, $e^2$, is secured to the outside of the front head of the cylinder and constructed to provide a journal bearing for the front end of the said shaft outside the said cylinder head. An idle pulley, G, is also mounted on a journal, $g$, set in a bracket bearing, $g'$, secured to the end of the cylinder casing and arranged between the two pulleys described, but in a horizontal plane somewhat higher, as seen in Fig. 3.

A hopper, H, is mounted at the front end of the machine over the inlet opening into the shelling cylinder and the slotted chute at one side thereof. The upper end of the hopper is contracted so that it is just about over the chute, but the inner side, $h$, is inclined outward toward the other side of the casing, coming down directly at the opposite side of the cut-away portion of the cylinder so as to cover and protect the said opening to the cylinder, as seen in Fig. 7.

A sheet, I, of either wood or metal, preferably the latter, is constructed of a size corresponding substantially to the cross section of the upper or shelling case and is secured within the latter just back of the ring $b^4$. This plate serves as a diaphragm shutting off the casing at this point to stop any corn which may be thrown outward and backward by the action of the shelling devices in front of this diaphragm. The diaphragm of course has an opening, $i$, for the shelling cylinder, and another one, $i'$, for the driver or beater shaft, both of which must of course pass through this diaphragm.

A feed elevator, J, of ordinary construction, is arranged to deliver picked ears of corn, either husked or unhusked, into the top of the hopper in the usual way.

The sheller shaft is driven from a shaft, K, mounted transversely at the front end of the frame and having a bevel gear, $k$, fixed thereon which is arranged to engage with the bevel gear on the front end of the sheller shaft and carries at one end a driving pulley, $k'$, by means of which motion is communicated to it from any suitable source. Obviously this will impart a rotary movement to the winged sheller shaft; and a belt, L, being passed around the pulleys on the rear ends of the sheller shaft and the beater shaft, the desired revolution will be imparted to the latter from the former. This belt is also carried to the corn elevator, the idle pulley serving as a guide to one portion of the belt for this purpose, as it is inclined away at one side of the machine. This belt is also to be run to the driving shaft of the elevator which takes up and delivers the shelled corn. This elevator frame, M, is shown in the drawings mounted at one side of the machine on a pivotal support, m. This driving connection is of ordinary construction and requires no special description here.

Immediately below the shelling devices is the main riddle, N, running the length of the main frame and mounted so as to permit a reciprocating or sliding lengthwise movement. Below this riddle, toward the rear end thereof, there is a series of separators, O, O' and O², and a chute, n, is secured to the forward end of the riddle and extends to the rear to these separators which are also constructed and arranged to be reciprocated lengthwise. At the front of this separating mechanism there is a transverse trough or receptacle, P, into which the cleaned corn is delivered from the separators and in which is mounted a spiral conveyer, p, which is rotated by any suitable device and conveys the shelled corn to one end of the receptacle where it connects with the elevator frame, M, for the purpose of delivering the shelled corn to the elevator. In front of the receiving trough is a blower, Q, the discharge opening of the case being just over one edge of the trough and opposite the lower portion of the separating mechanism. All of these parts are of old and well known construction and do not individually constitute any part of the present invention. Hence they require no special description here, and as the same is true of the mechanism for driving or operating these old parts, it is unnecessary to give them attention or description further than to say they are illustrated in the drawings and are well known and in common use.

At the rear end of the shelling cylinder there is a kind of plate or table, R, being a sheet of metal or other suitable material, extending across the upper frame from side to side and secured at its front edge to the rear head of the shelling cylinder below the brackets which are mounted thereon. This plate extends to the rear horizontally a short distance and then is bent down a little way, thus providing a downward curved section, r, at the rear free edge thereof which reaches down toward the riddle. A flap, S, of any suitable material, is connected at its upper edge to this curve of the said plate from which it depends almost to the riddle. It extends across the space within the frame or casing above the riddle and serves as a kind of swinging diaphragm to stop this passage. Preferably this flap is of flexible fabric.

The operation is as follows: The machine being set in motion, the driving mechanism is so arranged that the winged sheller shaft will be revolved in the direction indicated by arrows in the drawings, and the same remark applies to the shaft carrying the arms or beaters at the bottom of the hopper. The driving devices are so regulated that a very high rate of speed is given to these two revolving shafts. The ears of corn are delivered by the elevator directly into the hopper where they drop into the opening leading into the shelling cylinder, and if there is any jamming of the ears or tendency to clog in the hopper, the arms on the small parallel shaft break up this tendency and drive the ears along into the cylinder. The spiral wings on the sheller shaft take the ears of corn as they are delivered into the cylinder, carrying them forward by the usual action of spirals, and by reason of the rapid rotation given to this device, the ears are thrown with great force and rapidity against the surrounding cylinder. In this operation the ears of corn are acted upon individually, that is, each one is struck separately and driven violently against the bars of the cylinder by the wings of the sheller shaft. The force is such that the ears rebound from the bars of the cylinder and are caught again by the shaft-wings and again forcibly thrown against the surrounding case or cylinder; so the ears are carried forward by the spiral arrangement of the wings and at the same time are beaten back and forth, again and again, with great force between said wings and the cylinder, until finally they are brought to the bottom opening of the cylinder. This action does not depend upon the quantity of corn ears fed into the shelling devices. A single ear or a simple handful of ears dropped into the cylinder, when the sheller shaft is under its usual high rate of motion, will be as perfectly shelled as when the feed is regular and rapid. These rapid, severe blows detach the kernels from the cobs and also separate them from the shucks if the ears are not husked. This effect is also assisted by the lugs or projections on the outer edges of the wings. The kernels of corn freed from the cobs and shucks are driven or dropped through the spaces in the cylinder and fall upon the riddle below. The cobs and shucks are carried along through the cylinder by the action of the spiral sheller shaft and are delivered through the bottom opening at the rear end of the cylinder upon the riddle also. The entire mass is therefore delivered upon the surface of this riddle, through the usual action of which the first separation is effected. The cobs, shucks and any other coarse material are discharged at the rear end of the riddle to an elevator or any other device desired and the shelled corn, mixed with more or less dirt as usual, drops through the riddle and is delivered to the separators below, where it is cleaned from dirt by the action of the separators and the blast from the blower, as usual, and delivered to the trough or receptacle below, from which it is conveyed to the corn elevator. In the operation of the shelling devices moving so rapidly kernels of corn are thrown outward and rearward from the cylinder with great force. In order to stop these kernels in a rearward direction the diaphragm, I, is provided extending across the sheller chamber from side to side just at the outlet opening from the cylinder. The kernels of corn flying out from the cylinder with great rapidity and force would in large measure be driven to the rear and even out at the rear end of the frame casing if there was no stop. Hence this diaphragm has an important function in the operation of this mechanism. More or less corn will also be discharged with the refuse at the rear end of the cylinder and with substantially the same force. In order to prevent any of the corn being thrown from this point out at the rear end of the casing the pivoted flap, S, is provided and the plate, R, by which it is carried, this latter device being extended backward some distance from the cylinder so as to bring the flap near the outer end of the casing therefor, the plate also providing a covering to the passageway, which prevents any kernels of corn from flying out in that direction.

It will be noticed that the shelling devices are arranged lengthwise of the frame of the machine. This arrangement is convenient, economical and of considerable importance, for obviously if arranged transversely of the main frame it would require an extension on one or both sides of the latter, which would make the machine cumbersome and difficult of transportation from place to place and especially through gates and bars. Attention is also called to the arrangement of the shelling mechanism in substantially a horizontal position, which arrangement avoids objectionable height in the frame of the machine and at the same time secures an action of the shelling mechanism and separating devices which is very satisfactory.

There may be modifications in the mechanism of the corn sheller herein described and shown without departing from the main features of my invention. The wings on the sheller shaft may not be arranged on a regular spiral line around the shaft, but may be composed of regular spiral sections and connecting sections, running in a different direction, and may be provided with edge lugs or projections as described, or the latter may be dispensed with. The devices for driving the armed feed shaft and the shelled corn elevator may also be modified by substituting toothed gearing between the sheller shaft and the feed shaft in place of the band and pulleys shown in the drawings; and other like modifications.

The shelling cylinder may be constructed differently from the specific description here given, and other like changes may be effected without changing the general type of the machine. Such mechanical changes are contemplated as within my invention and will be made as occasion may seem to demand or judgment may dictate.

Having thus described my invention, what I claim as new, and desire to secure by Letters Patent, is—

1. In a corn sheller, a shelling cylinder with openings along its length for the escape of shelled corn and a large inlet opening at the front end thereof for the reception of ears, in combination with a revoluble sheller shaft arranged within the cylinder; a hopper mounted at the front end of the cylinder and opening into the inlet thereof but extending at one side beyond the edge of said opening and the cylinder itself; a slightly inclined shelf or chute at the bottom of the hopper between the inner edge of the cylinder inlet and the outer side of the hopper and provided with slots running across the space between the cylinder and the outer side of the hopper; and a revoluble supplementary shaft mounted within the shelling case lengthwise thereof, extending underneath said chute and provided with projections or arms corresponding to the slots in said chute through which they pass in the revolution of the shaft; substantially as described.

2. In a corn sheller, a shelling cylinder having a top inlet at its front end and an outlet at its rear end in the bottom of the cylinder structure and in front of its rear extremity in combination with a revoluble winged sheller shaft mounted therein; a frame or casing within which this shelling mechanism is arranged; and a fixed diaphragm extending across said casing just in front of the outlet opening of the shelling cylinder and some distance in front of the open rear end of said cylinder; substantially as described.

3. In a corn sheller, a main frame, in combination with a shelling cylinder, B, arranged lengthwise thereof; a revoluble sheller, C, mounted in said cylinder; a plate, R, secured to the rear head of the cylinder extending across the sheller frame and to the rear of the cylinder; a riddle, N, arranged immediately below the shelling mechanism; and a flap, S, hinged to the free edge of the plate, R, and depending nearly to the riddle; substantially as described.

4. In a corn sheller, a shelling cylinder, in combination with a revoluble sheller shaft passing through said cylinder lengthwise, a revoluble counter shaft mounted parallel to the sheller shaft in nearly the same horizontal plane and provided with beater arms or lugs, for a short distance at its front end, projecting outward directly from the shaft, an upright hopper at the front end of the machine, wide enough at its lower end sufficiently to include within its space the front end of the sheller shaft and the front end of the counter shaft which is provided with forcing arms or lugs, a short, inclined guide at one side of the hopper bottom, extending inward just above the counter shaft to the cylinder opening and constructed to allow the lugs or arms on the counter shaft to pass up and work through it within the bottom space of the hopper, and mechanism for rotating both said shafts, whereby the ears of corn are delivered by the hopper simultaneously to the action of both the sheller shaft and armed section of the counter shaft at the front ends of the two devices, substantially as described.

5. In a corn sheller, a shelling cylinder consisting of fixed heads, $b'$—$b^2$, and forming its respective closing ends, rings, as $b^3$—$b^4$, fixed at different points between the heads, and rods, $b$, mounted and held in the said parts, with an inlet in the upper side of the front end and an outlet in the under side of the rear end thereof in combination with a revoluble sheller shaft, $c$, provided with spiral wings or flanges, $c'$, running lengthwise thereof and having short lugs or projections, $c^2$, on their edges all arranged substantially in the same vertical planes as the respective support rings; substantially as described.

HENRY A. ADAMS.

Witnesses:
J. M. THACHER,
I. A. HELMICH.